(12) United States Patent
An et al.

(10) Patent No.: US 12,470,821 B2
(45) Date of Patent: Nov. 11, 2025

(54) ELECTRONIC DEVICE, CAMERA DEVICE, AND ANTI-SHAKE METHOD AND ANTI-SHAKE APPARATUS FOR CAMERA DEVICE

(71) Applicant: VIVO MOBILE COMMUNICATION CO., LTD., Dongguan (CN)

(72) Inventors: Kun An, Dongguan (CN); Wei Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 231 days.

(21) Appl. No.: 18/206,605

(22) Filed: Jun. 6, 2023

(65) Prior Publication Data
US 2023/0328376 A1     Oct. 12, 2023

Related U.S. Application Data

(63) Continuation of application No. PCT/CN2021/134937, filed on Dec. 2, 2021.

(30) Foreign Application Priority Data

Dec. 7, 2020   (CN) .......................... 202011419969.4

(51) Int. Cl.
*H04N 23/68* (2023.01)
*G02B 23/16* (2006.01)
(Continued)

(52) U.S. Cl.
CPC .......... *H04N 23/687* (2023.01); *G02B 23/16* (2013.01); *H04N 23/50* (2023.01); *H04N 23/51* (2023.01);
(Continued)

(58) Field of Classification Search
CPC ........ H04N 23/50; H04N 23/51; H04N 23/54; H04N 23/55; H04N 23/68; H04N 23/682;
(Continued)

(56) References Cited

U.S. PATENT DOCUMENTS 7,962,021 B2 *   6/2011  Uenaka .................... G03B 5/00
                                              396/53
2009/0245771 A1 * 10/2009  Uenaka .................. H04N 23/68
                                              396/53
(Continued)

FOREIGN PATENT DOCUMENTS

CN          102654630 A      9/2012
CN          209402560 U      9/2019
(Continued)

OTHER PUBLICATIONS

International Search Report issued in corresponding International Application No. PCT/CN2021/134937, mailed Feb. 17, 2022, 6 pages.
(Continued)

*Primary Examiner* — Twyler L Haskins
*Assistant Examiner* — Akshay Trehan
(74) *Attorney, Agent, or Firm* — IPX PLLC

(57) ABSTRACT

This application discloses an electronic device, a camera device, and an anti-shake method and anti-shake apparatus for the camera device. The camera device includes a camera assembly, a support frame, a telescopic connection unit, and a driving unit. The camera assembly is disposed on the support frame and is configured to rotate around an optical axis of the camera assembly relative to the support frame. The telescopic connection unit is rotatably connected to the camera assembly, and a rotation axis of rotation of the telescopic connection unit relative to the camera assembly is parallel to the optical axis. The driving unit is connected to
(Continued)

the telescopic connection unit and drives the telescopic connection unit to move. The camera assembly is configured to rotate around the optical axis along with movement of the telescopic connection unit.

10 Claims, 4 Drawing Sheets

(51) Int. Cl.
    *H04N 23/50*     (2023.01)
    *H04N 23/51*     (2023.01)
    *H04N 23/54*     (2023.01)
    *H04N 23/55*     (2023.01)
    *H04N 23/57*     (2023.01)

(52) U.S. Cl.
    CPC ............ *H04N 23/54* (2023.01); *H04N 23/55* (2023.01); *H04N 23/57* (2023.01); *H04N 23/685* (2023.01); *G03B 2205/0007* (2013.01); *G03B 2205/0053* (2013.01); *H04M 2250/20* (2013.01)

(58) Field of Classification Search
    CPC .... H04N 23/685; H04N 23/687; H04N 23/57; G02B 23/16; G02B 23/20; H04M 2250/20; G03B 2205/0007; G03B 2205/0038; G03B 2205/0053; G03B 2205/0061; G03B 2205/0069; G03B 2205/0076; G03B 2205/0084
    See application file for complete search history.

(56) References Cited

U.S. PATENT DOCUMENTS

| | | | | |
|---|---|---|---|---|
| 2009/0245774 | A1* | 10/2009 | Uenaka | H04N 23/6812 |
| | | | | 348/208.11 |
| 2010/0245601 | A1* | 9/2010 | Kato | H04N 23/68 |
| | | | | 348/208.4 |
| 2012/0218636 | A1 | 8/2012 | Suzuka | |

FOREIGN PATENT DOCUMENTS

| | | | | |
|---|---|---|---|---|
| CN | 110572556 A | 12/2019 | | |
| CN | 110784650 A | 2/2020 | | |
| CN | 208707750 U | * 4/2020 | ............ | H04N 23/00 |
| CN | 111131673 A | * 5/2020 | ........... | H04N 23/687 |
| CN | 111552092 A | 8/2020 | | |
| CN | 211266959 U | 8/2020 | | |
| CN | 112492173 A | 3/2021 | | |

OTHER PUBLICATIONS

First Office Action issued in corresponding CN Patent Application No. 202011419969.4, dated Oct. 11, 2021, 8 pages.

\* cited by examiner

ELECTRONIC DEVICE, CAMERA DEVICE, AND ANTI-SHAKE METHOD AND ANTI-SHAKE APPARATUS FOR CAMERA DEVICE

CROSS-REFERENCE TO RELATED APPLICATIONS

This application is a continuation of International Application No. PCT/CN2021/134937, filed on Dec. 2, 2021, which claims priority to Chinese Patent Application No. 202011419969.4, filed on Dec. 7, 2020. The entire contents of each of the above-identified applications are expressly incorporated herein by reference.

TECHNICAL FIELD

This application relates to the field of shooting technologies of electronic devices, and in particular to an electronic device, a camera device, and an anti-shake method and an anti-shake apparatus for the camera device.

BACKGROUND

With the rapid development of electronic devices, users have increasingly high requirements for a shooting function of electronic devices. Specifically, the users have increasingly high requirements for definition of shot images. In related technologies, the electronic device includes a camera device. The camera device is provided with an Optical Image Stabilization (OIS) control assembly and a sensor. When the user uses the electronic device for shooting, the user holds the electronic device with a hand for shooting. In this process, it is difficult for the user to keep a still shooting posture, and shake usually occurs. The sensor can detect tiny shake and transmit a detected signal to the OIS control assembly. The OIS control assembly controls the camera device to make relative displacement compensation, increasing definition of an image shot by the electronic device.

Because the OIS control assembly can control only the camera device to move linearly in a horizontal direction and vertical direction, but cannot make compensate for rotation, causing an unsatisfactory effect of an image effect shot by the electronic device.

SUMMARY

Embodiments of this application provide an electronic device, a camera device, and an anti-shake method and anti-shake apparatus for the camera device.

According to a first aspect, this application discloses a camera device. The camera device includes a camera assembly, a support frame, a telescopic connection unit, and a driving unit.

The camera assembly is disposed on the support frame and may rotate around an optical axis of the camera assembly relative to the support frame. The telescopic connection unit is rotatably connected to the camera assembly, and a rotation axis of rotation of the telescopic connection unit relative to the camera assembly is parallel to the optical axis. The driving unit is connected to the telescopic connection unit and drives the telescopic connection unit to move, and the camera assembly may rotate around the optical axis along with movement of the telescopic connection unit.

According to a second aspect, this application discloses an electronic device, including the foregoing camera device.

According to a third aspect, this application discloses an anti-shake method for a camera device. The camera device is the foregoing camera device. The anti-shake method includes:

determining a deflection angle of the camera assembly around the optical axis of the camera assembly;

determining an anti-shake compensation angle based on the deflection angle; and controlling, based on a formula $\alpha=\arcsin(L/R)$, the driving unit to drive the telescopic connection unit to move, where $\alpha$ is the anti-shake compensation angle, L is a distance by which the driving unit drives the telescopic connection unit to move, and R is a distance between the telescopic connection unit and the optical axis.

According to a fourth aspect, this application discloses an anti-shake apparatus for a camera device. The camera device is the foregoing camera device. The anti-shake apparatus includes:

a first determining module, configured to determine a deflection angle of the camera assembly around the optical axis of the camera assembly;

a second determining module, configured to determine an anti-shake compensation angle based on the deflection angle; and a control module, configured to control, based on a formula $\alpha=\arcsin(L/R)$, the driving unit to drive the telescopic connection unit to move, where $\alpha$ is the anti-shake compensation angle, L is a distance by which the driving unit drives the telescopic connection unit to move, and R is a distance between the telescopic connection unit and the optical axis.

REFERENCE NUMERALS

100—camera assembly, 110—camera, 111—lens, 120—camera support, 121—first guide groove;
200—support frame, 210—accommodation space, 211—avoidance opening, 220—first support part, 230—second support part, 240—second guide groove;
300—telescopic connection unit, 310—threaded hole;
400—driving unit, 410—driving body, 420—screw rod;
500—rolling body.

DETAILED DESCRIPTION

The following describes the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that, data used in such a way are interchangeable in proper circumstances, so that the embodiments of this application can be implemented in an order other than the order illustrated or described herein. Objects classified by "first," "second," and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, an electronic device provided in the embodiments of this application will be described in detail by using specific examples and application scenarios thereof.

Figure 1:
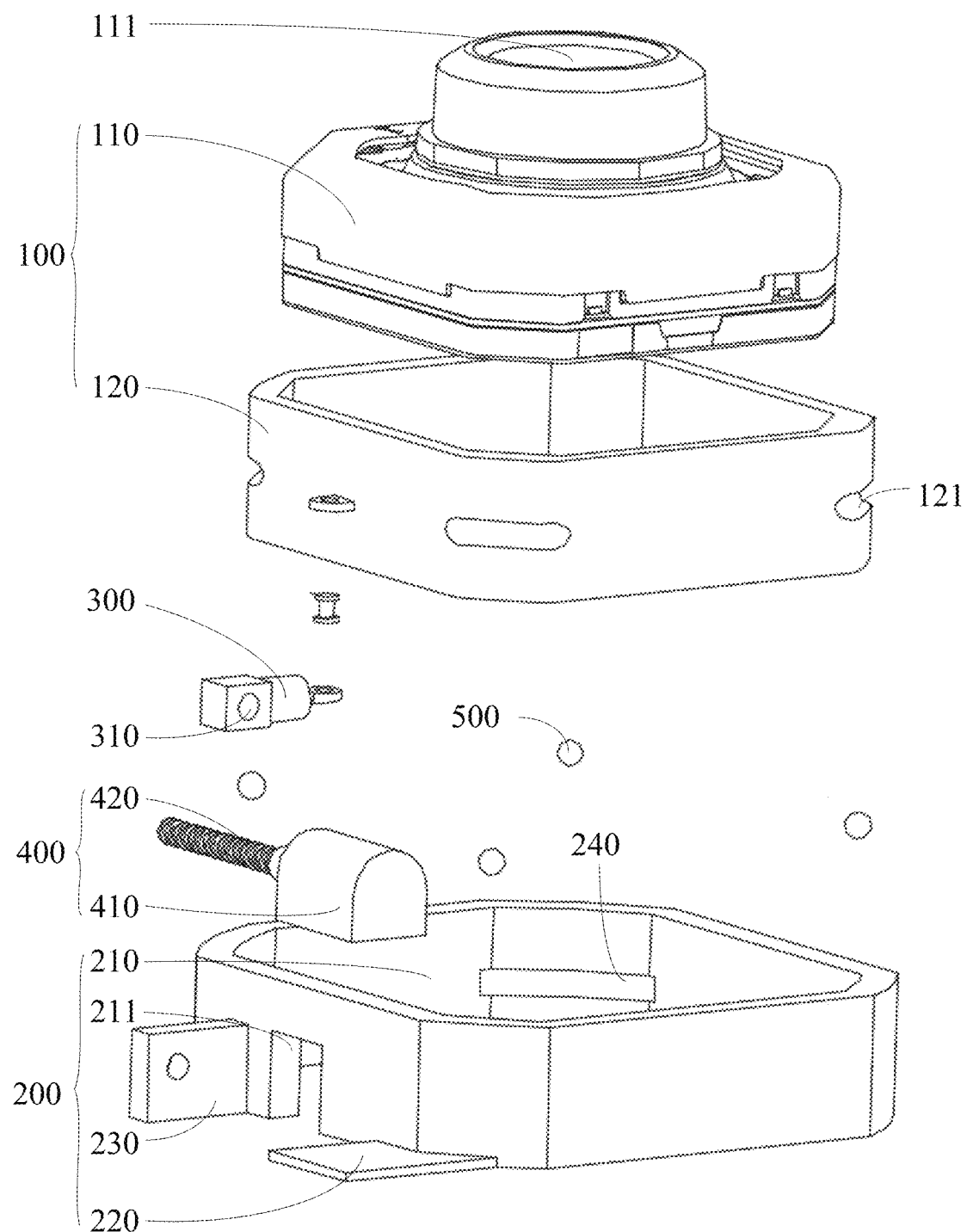
FIG. 1 is an exploded view of a camera device according to an embodiment of this application.
Figure 2:
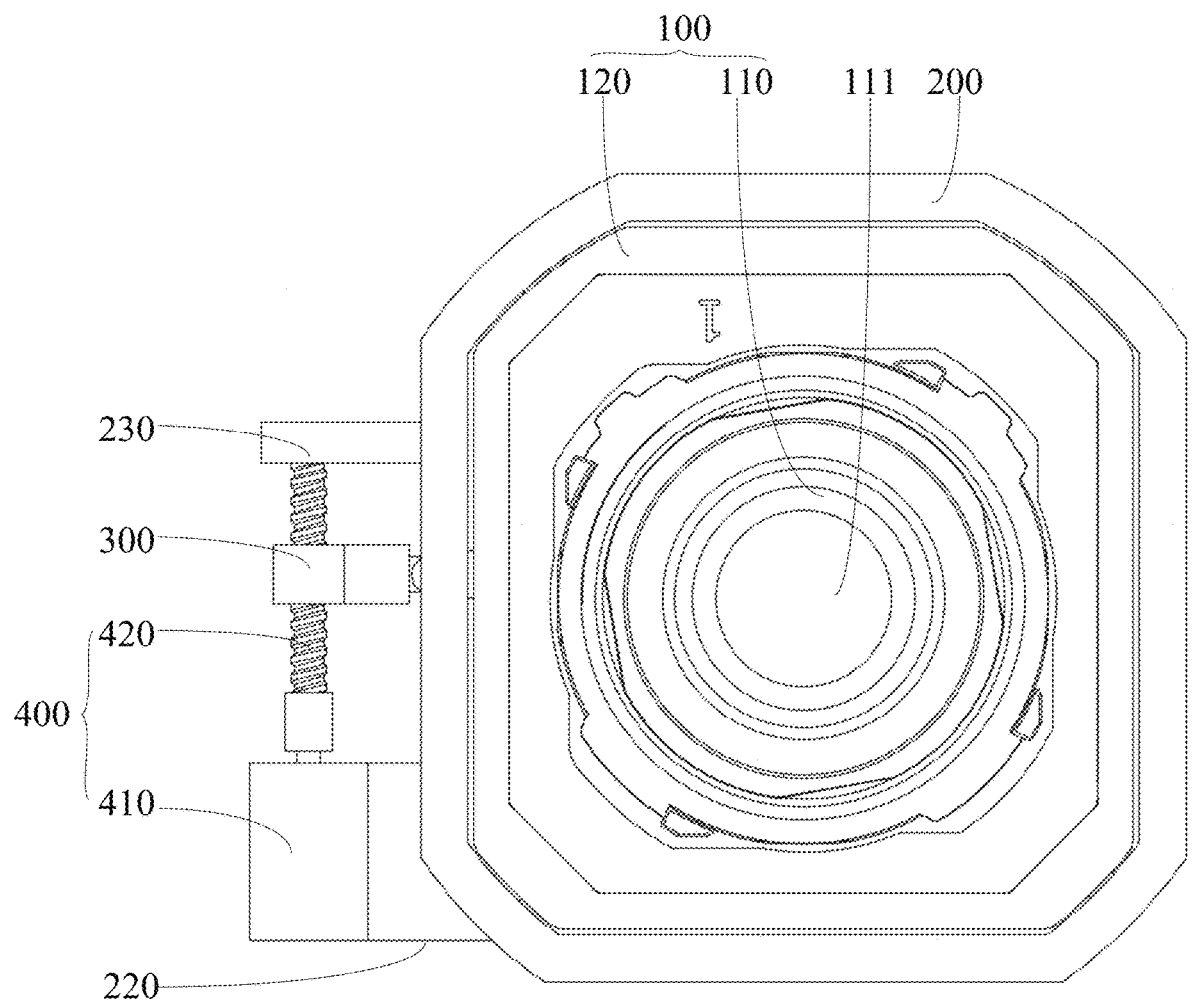
FIG. 2 is a schematic diagram of a structure of a camera device at an angle of view according to an embodiment of this application.
Figure 3:
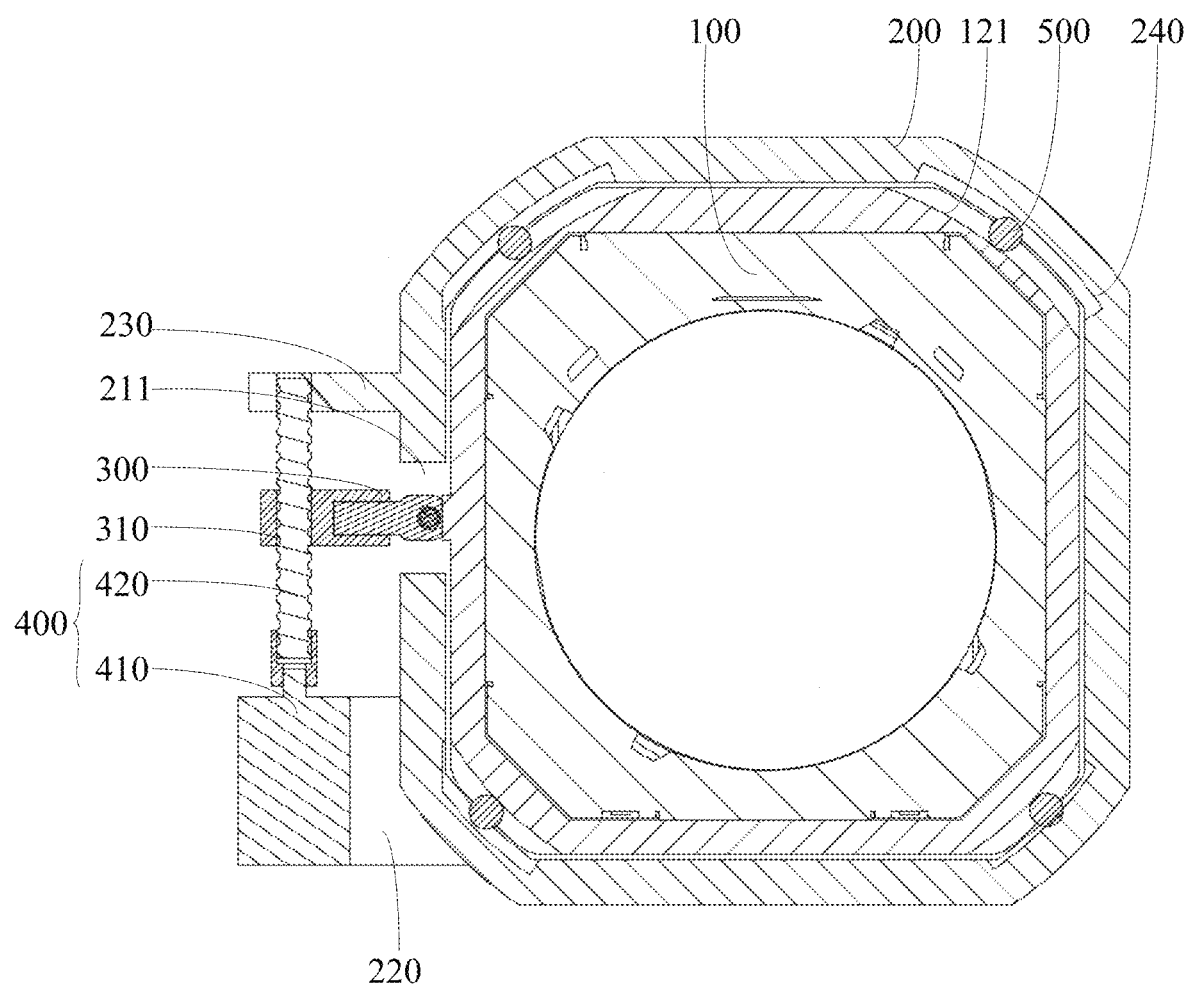
FIG. 3 is a sectional view of FIG. 2.
Figure 4:
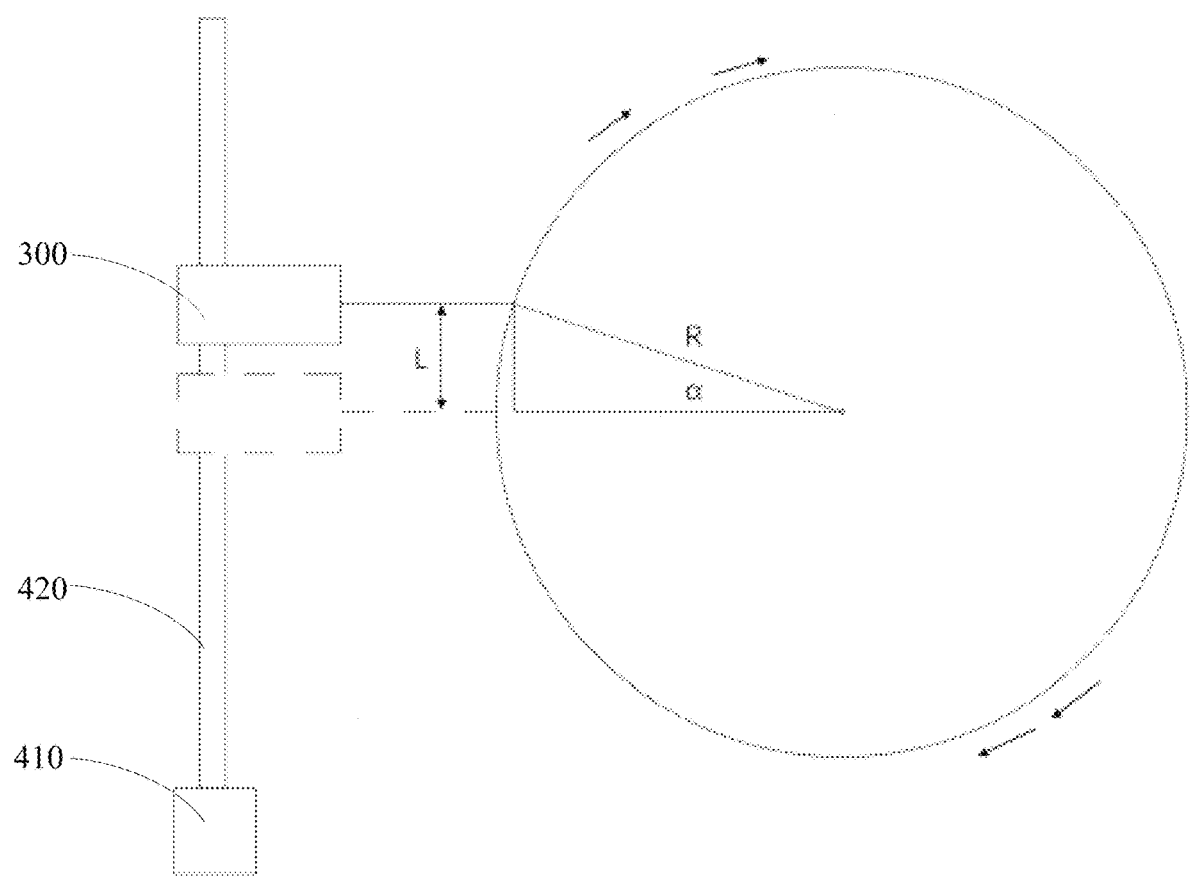
FIG. 4 is a diagram of a working principle of a camera device according to an embodiment of this application.

Refer to FIG. 1 to FIG. 4. An embodiment of this application discloses a camera device. The disclosed camera device includes a camera assembly 100, a support frame 200, a telescopic connection unit 300, and a driving unit 400.

The camera assembly 100 is a shooting function component of the camera device, and the camera assembly 100 can shoot an image along an optical axis of the camera assembly 100.

The support frame 200 is an installation foundation of the camera assembly 100, the telescopic connection unit 300, and the driving unit 400. Under a normal circumstance, the support frame 200 may have accommodation space 210. At least a part of the camera assembly is disposed in the accommodation space 210. The support frame 200 can protect the camera assembly 100.

During assembly of the camera device, the camera assembly 100 may be disposed on the support frame 200, and may rotate around an optical axis of the camera assembly 100 relative to the support frame 200. The telescopic connection unit 300 may be rotatably connected to the camera assembly 100. A rotation axis of rotation of the telescopic connection unit 300 relative to the camera assembly 100 is parallel to the optical axis, so that the telescopic connection unit 300 can also rotate relative to the camera assembly 100 while the camera assembly 100 rotates. In addition, the telescopic connection unit 300 can adapt to a change of a position at which the camera assembly 100 is connected to the telescopic connection unit 300 through expansion and contraction. The driving unit 400 may be firmly disposed on the support frame 200. The driving unit 400 may be connected to the telescopic connection unit 300 and drive the telescopic connection unit 300 to move, so that the camera assembly 100 can rotate around the optical axis with the movement of the telescopic connection unit 300. Of course, during rotation of the camera assembly 100, the telescopic connection unit 300 expands and contracts, to achieve rotation of the camera assembly 100.

The telescopic connection unit 300 may be a pull rod or an elastic member (such as a spring). In an embodiment of this application, the telescopic connection unit 300 may include a cylinder body and a piston rod slidably disposed in the cylinder body, and the cylinder body is provided with a threaded hole 310 described later. The piston rod is rotatably connected to the camera assembly 100.

When the camera device works, the driving unit 400 can drive the telescopic connection unit 300 to move, and the telescopic connection unit 300 is rotatably connected to the camera assembly 100, so that the driving unit 400 drives the telescopic connection unit 300 to move and drives the camera assembly 100 to rotate along the optical axis on the support frame 200. The camera device is used in the electronic device. When the user uses the electronic device for shooting, it is difficult for the user to keep a still shooting posture, and shake usually occurs. A sensor of the electronic device can detect tiny deflection. Therefore, the electronic device drives, through the driving unit 400, the telescopic connection unit 300 to move and drives the camera assembly 100 to rotate along the optical axis on the support frame 200. Further, the camera device can increase compensation for tiny movement of the electronic device by rotating along the optical axis, finally improving an effect of an image shot by the electronic device.

In addition, in the camera device disclosed in embodiments of this application, the driving unit 400 drives the telescopic connection unit 300 to move linearly, thereby driving the camera assembly 100 to rotate. Because a direction of linear movement is relatively single, it is easy to control accuracy of linear movement. Rotation implemented in a driving mode of linear movement better helps to control rotation accuracy by controlling the accuracy of linear movement, achieving higher-precision anti-shake.

In an embodiment of this application, the support frame 200 may be a housing structural member. In an embodiment of this application, the housing structural member may have the accommodation space 210, and the camera assembly 100 may be disposed in the accommodation space 210. Therefore, space of overlapping between the camera assembly 100 and the support frame 200 along the optical axis direction is reduced, and overall dimensions of the camera device are further reduced, helping miniaturization of the camera device.

In an embodiment of this application, the camera assembly 100 may include a camera 110, and a lens 111 of the camera 110 may face an opening of the accommodation space 210 or pass through an opening of the accommodation space 210, so that the support frame 200 does not affect view finding of the lens 111.

In an embodiment of this application, a side wall of the accommodation space 210 may be provided with an avoidance opening 211. In an embodiment of this application, the driving unit 400 may be located outside the accommodation space 210. This enables the driving unit 400 and the camera assembly 100 to be respectively disposed on an inner side and outer side of the support frame 200, and further enables maintenance personnel to replace the driving unit 400 without disassembling the support frame 200, facilitating maintenance and assembly. In an embodiment of this application, a first end of the telescopic connection unit 300 may be connected to the driving unit 400, and a second end of the telescopic connection unit 300 can pass through the avoidance opening 211 and be rotationally connected to the camera assembly 100, so that the telescopic connection unit 300 passes through the avoidance opening 211 to drive the camera assembly 100 to rotate.

In an embodiment of this application, the driving unit 400 may be a pneumatic driving unit, a hydraulic driving unit, or another unit that can drive linear movement. In an embodiment of this application, the driving unit 400 may be a motor driving unit, and the driving unit 400 may include a driving body 410 and a screw rod 420. In an embodiment of this application, the driving body 410 may be disposed on the support frame 200, and the screw rod 420 may be rotatably disposed on the support frame 200. The driving body 410 may be connected to the screw rod 420, and the screw rod 420 may be connected to a power output shaft of the driving body 410 by welding or connection with a threaded connector. The driving body 410 can drive the screw rod 420 to rotate. The telescopic connection unit 300 is provided with a threaded hole 310. The screw rod 420 can match the threaded hole 310 to form a screw unit. The telescopic connection unit 300 can move along with rotation of the screw rod 420, so that the telescopic connection unit 300 can move through threaded engagement of the screw rod 420 with the threaded hole 310, and then the telescopic connection unit 300 can drive the camera assembly 100 to rotate.

In the foregoing unit, because the screw rod 420 is threadedly engaged with the threaded hole 310 with relatively high engagement accuracy, the telescopic connection unit 300 can move linearly with higher accuracy, and rotation accuracy of the camera assembly 100 is further increased indirectly.

In an embodiment of this application, the driving body 410 may include a stepping motor, and the support frame 200 may be firmly provided with a first support part 220 and a second support part 230. In an embodiment of this application, both the first support part 220 and the second support part 230 may be located outside the accommodation space 210, and the driving body 410 may be fastened to the first support part 220, so that the driving body 410 drives the screw rod 420 to rotate more stably. The driving body 410 may be fastened to the first support part 220 by welding, bonding, connection with a threaded connector, or the like. A first end of the screw rod 420 may be connected to the driving body 410, and a second end of the screw rod 420 may be rotatably supported on the second support part 230, so that both ends of the screw rod 420 are supported, further increasing rotation stability of the screw rod 420. In addition, the stepper motor has relatively high precision and can drive, with higher precision, the telescopic connection unit 300 to move.

In an embodiment of this application, the camera assembly 100 and the support frame 200 are rotationally matched through a rolling body 500. In an embodiment of this application, the rolling body 500 is rotatably disposed in the accommodation space 210 along the optical axis direction, and the rolling body 500 may be between an outer side of the camera assembly 100 and an inner wall of the support frame 200. In this case, connection between the camera assembly 100 and the support frame 200 is rolling connection, so that wear between the camera assembly 100 and the support frame 200 can be reduced.

In an embodiment of this application, the camera assembly 100 may be provided with at least two first guide grooves 121. In addition, the support frame 200 may be provided with at least two second guide grooves 240. In an embodiment of this application, guide space may be formed between each first guide groove 121 and a second guide groove 240 opposite to each first guide groove 121. The rolling body 500 may be disposed in the guide space, so that the camera assembly 100 can drive the rolling body 500 to rotate along a guide direction of the guide space, and a sliding friction between the camera assembly 100 and the support frame 200 is further reduced. Finally, when smooth rotation of the camera assembly 100 in the accommodation space 210 is increased, the rolling body 500 is partially located in the camera assembly 100 and the support frame 200, enabling a structure of the camera device to be more compact and helping miniaturization of the camera device.

In addition, the rolling body 500 may be a cylindrical rolling body, a spherical rolling body, or the like, which is not limited in this embodiment of this application.

In an embodiment of this application, the camera assembly 100 may include a camera 110 and a camera support 120. The camera 110 may be disposed on the camera support 120 by bonding, welding, connection with a threaded connector, or the like, and the camera support 120 can protect the camera 110. In an embodiment of this application, at least two first guide grooves 121 may be provided in the camera support 120, preventing the first guide groove 121 from being directly disposed in the camera 110. Further, maintenance personnel only need to replace the camera support if the first guide groove 121 is damaged. The at least two first guide grooves 121 may be disposed at corners of the camera support 120, at least two second guide grooves 240 may be disposed in the support frame 200, and the at least two second guide grooves 240 may be disposed in an inner wall that is of the support frame 200 and that is opposite to the corners of the camera support 120. Both the camera support 120 and the support frame 200 may be integrally injection-molded structural members. Structural consistency of the camera support 120 and the support frame 200 in mass production can be easily ensured by injection molding, and production efficiency can also be improved.

Based on the camera device disclosed in the embodiments of this application, an embodiment of this application discloses an electronic device. The disclosed electronic device includes the foregoing camera device.

The electronic device disclosed in this embodiment of this application may be a mobile phone, a tablet computer, an e-book reader, a wearable device (such as smart glasses and a smart watch), a game machine, a medical device, or the like. A specific type of the electronic device is not limited in this embodiment of this application.

An embodiment of this application discloses an anti-shake method for a camera device. The disclosed anti-shake method includes the following steps.

Step 101: Determine a deflection angle of the camera assembly 100 around the optical axis of the camera assembly 100.

In this step, the deflection angle of the camera assembly 100 may be detected by a gyroscope.

Step 102: Determine an anti-shake compensation angle based on the deflection angle.

A value of the anti-shake compensation angle is equal to a value of the deflection angle, and an anti-shake compensation direction is opposite to a deflection direction.

Step 103: Control, based on a formula $\alpha = \arcsin(L/R)$, the driving unit 400 to drive the telescopic connection unit 300 to move.

$\alpha$ is the anti-shake compensation angle, L is a distance by which the driving unit 400 drives the telescopic connection unit 300 to move, and R is a distance between the telescopic connection unit 300 and the optical axis.

During the working, the camera device can drive, based on a shaking state of the camera device, the telescopic connection unit 300 to move, to drive the camera assembly 100 to rotate. Therefore, it can be prevented that a user does not easily keep a still shooting posture when the user uses the electronic device for shooting, increasing an effect of an image shot by the camera device.

The camera device disclosed in embodiments of this application can implement processes for implementing the anti-shake method in the foregoing method embodiment. To avoid repetition, the details are not described herein again.

An embodiment of this application discloses an anti-shake apparatus of a camera device. The disclosed anti-shake apparatus includes:

a first determining module, configured to determine a deflection angle of the camera assembly 100 around the optical axis of the camera assembly 100;

a second determining module, configured to determine an anti-shake compensation angle based on a deflection angle; and a control module, configured to control, based on a formula α=arcsin(L/R), the driving unit 400 to drive the telescopic connection unit 300 to move.

α is the anti-shake compensation angle, L is a distance by which the driving unit 400 drives the telescopic connection unit 300 to move, and R is a distance between the telescopic connection unit 300 and the optical axis.

During the working, the first determining module can determine a deflection state of the camera assembly 100, and the second determining module can determine an anti-shake compensation angle of the camera assembly 100 based on the deflection state of the camera assembly 100. Therefore, the control module can control an amount of movement of the telescopic connection unit 300 driven by the driving unit 400, and anti-shake compensation is further implemented and an anti-shake effect of the camera device is further increased.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A camera device, comprising:
a camera assembly;
a support frame;
a telescopic connection unit; and
a driving unit, wherein:
the camera assembly is disposed on the support frame and is configured to rotate around an optical axis of the camera assembly relative to the support frame;
the telescopic connection unit is rotatably connected to the camera assembly;
a rotation axis of rotation of the telescopic connection unit relative to the camera assembly is parallel to the optical axis;
the driving unit is connected to the telescopic connection unit and drives the telescopic connection unit to move, expand, and contract to rotate the camera assembly; and
the camera assembly is configured to rotate around the optical axis along with movement of the telescopic connection unit.

2. The camera device according to claim 1, wherein the support frame is a housing structural member, the housing structural member comprises an accommodation space, the camera assembly is disposed in the accommodation space, the camera assembly comprises a camera, and a lens of the camera faces an opening of the accommodation space or passes through an opening of the accommodation space.

3. The camera device according to claim 2, wherein a side wall of the accommodation space is provided with an avoidance opening, the driving unit is located outside the accommodation space, a first end of the telescopic connection unit is connected to the driving unit, and a second end of the telescopic connection unit passes through the avoidance opening and is rotatably connected to the camera assembly.

4. The camera device according to claim 2, wherein the driving unit comprises a driving body and a screw rod, the driving body is disposed on the support frame, the screw rod is rotatably disposed on the support frame, the driving body is connected to the screw rod, the driving body drives the screw rod to rotate, the telescopic connection unit is provided with a threaded hole, the screw rod is matched with the threaded hole, and the telescopic connection unit is configured to move along with rotation of the screw rod.

5. The camera device according to claim 4, wherein the driving body comprises a stepping motor, the support frame is firmly provided with a first support part and a second support part, both the first support part and the second support part are located outside the accommodation space, the driving body is fastened to the first support part, a first end of the screw rod is connected to the driving body, and a second end of the screw rod is rotatably supported on the second support part.

6. The camera device according to claim 1, wherein the camera assembly and the support frame are rotationally matched through a rolling body.

7. The camera device according to claim 6, wherein the camera assembly is provided with at least two first guide grooves, the support frame is provided with at least two second guide grooves, and guide space is formed between each first guide groove and a second guide groove opposite to each first guide groove, and the rolling body is disposed in the guide space.

8. The camera device according to claim 7, wherein the camera assembly comprises a camera and a camera support, the camera is disposed on the camera support, the at least two first guide grooves are provided at the camera support, and the at least two second guide grooves are provided at the support frame.

9. An electronic device, comprising the camera device according to claim 1.

10. An anti-shake method for a camera device, comprising:
determining a deflection angle of a camera assembly around an optical axis of the camera assembly;
determining an anti-shake compensation angle based on the deflection angle; and
controlling, based on a formula α=arcsin(L/R), a driving unit to drive a telescopic connection unit to move, expand, and contract to rotate the camera assembly, wherein a rotation axis of rotation of the telescopic connection unit relative to the camera assembly is parallel to the optical axis,
wherein α is the anti-shake compensation angle, L is a distance by which the driving unit drives the telescopic connection unit to move, and R is a distance between the telescopic connection unit and the optical axis.

* * * * *